(12) United States Patent
Barnett

(10) Patent No.: US 11,753,539 B2
(45) Date of Patent: Sep. 12, 2023

(54) SIMULATED MARBLE SLAB AND PROCESS

(71) Applicant: Stephen Barnett, Marshall, NC (US)

(72) Inventor: Stephen Barnett, Marshall, NC (US)

( * ) Notice: Subject to any disclaimer, the term of this patent is extended or adjusted under 35 U.S.C. 154(b) by 1 day.

(21) Appl. No.: 16/887,759

(22) Filed: May 29, 2020

(65) Prior Publication Data

US 2021/0371643 A1 Dec. 2, 2021

(51) Int. Cl.
*C08L 67/00* (2006.01)

(52) U.S. Cl.
CPC ......... *C08L 67/00* (2013.01); *C08L 2205/025* (2013.01)

(58) Field of Classification Search
CPC .................................................... C08L 67/00
See application file for complete search history.

(56) References Cited

U.S. PATENT DOCUMENTS

| | | | | |
|---|---|---|---|---|
| 4,554,118 A | * | 11/1985 | Seifert ............... | B29C 37/0032 264/245 |
| 5,164,425 A | * | 11/1992 | Uchida ................. | C04B 26/10 428/15 |
| 5,166,230 A | * | 11/1992 | Stecker ................. | C04B 26/16 428/15 |
| 5,324,757 A | | 6/1994 | Ohkawa et al. | |
| 5,820,799 A | * | 10/1998 | Barnett ............... | B29C 39/023 264/73 |
| 2006/0267230 A1 | | 11/2006 | Rha et al. | |

FOREIGN PATENT DOCUMENTS

JP 201889934 A 6/2018

OTHER PUBLICATIONS

"Calcium Carbonate," Wikkipedia, 2001 [retrieved from the internet on Jul. 20, 2021 at <https://en.wikipedia.org/wiki/Calcium_carbonate>].

* cited by examiner

*Primary Examiner* — Michael F Pepitone
(74) *Attorney, Agent, or Firm* — Bryan L. Baysinger; Carlo J. Salas; Maynard Nexsen PC

(57) ABSTRACT

Disclosed herein is a process for making a marble appearing casting having superior depth characteristics by placing a low-density polymerizable resin into a mold to at least partially cover the bottom thereof placing a high-density polymerizable resin on top of the low-density resin to completely cover the low-density resin, allowing the low-density resin to float up through the high-density resin as both resins polymerize and solidify.

1 Claim, 2 Drawing Sheets

SIMULATED MARBLE SLAB AND PROCESS

CROSS-REFERENCE TO RELATED APPLICATIONS

Not applicable

BACKGROUND

This invention relates generally to the art of synthetic marble and more particularly to a process of producing such synthetic marble.

Aesthetically, consumers typically prefer countertops, sinks, tabletops and other similar objects to be made from material resembling marble. However, real marble is very expensive and very heavy. Therefore, in most instances using real marble is unrealistic. Accordingly, marble substitutes, known as densified marble casting materials are typically used. These materials comprise resins that upon densification, pigmentation, mixing and curing produce a marble effect. To date individual marble casting materials have had varying degrees of success due to faults within their compositions, design and appearance.

Accordingly, there is room for improvement within the art.

SUMMARY

It is the object of this invention to provide a densified cast marble object for use in countertops, sinks, tabletops and other similar products that is aesthetically pleasing.

It is a further object of this invention to provide a cast marble object for use in countertops, sinks, tabletops, and other similar products that is capable of many different color combinations while still providing for visual color separation.

It is a yet further the object of this invention to provide a cast marble object for use as above described with superior visual depth characteristics.

These and other objects are accomplished with a solidified cast object which has been prepared from at least two not totally compatible resins wherein a low-density resin has been placed first into a mold cavity covering the low-density resin with a high-density polymerizable resin and allowing the low-density resin to float through the high-density resin as both resins polymerize and solidify.

BRIEF DESCRIPTION OF THE DRAWINGS

In the figures.

DETAILED DESCRIPTION

According to this invention, a cast marble object having depth characteristics for use as a decorative surface is produced by the method set forth below.

Figure 1:
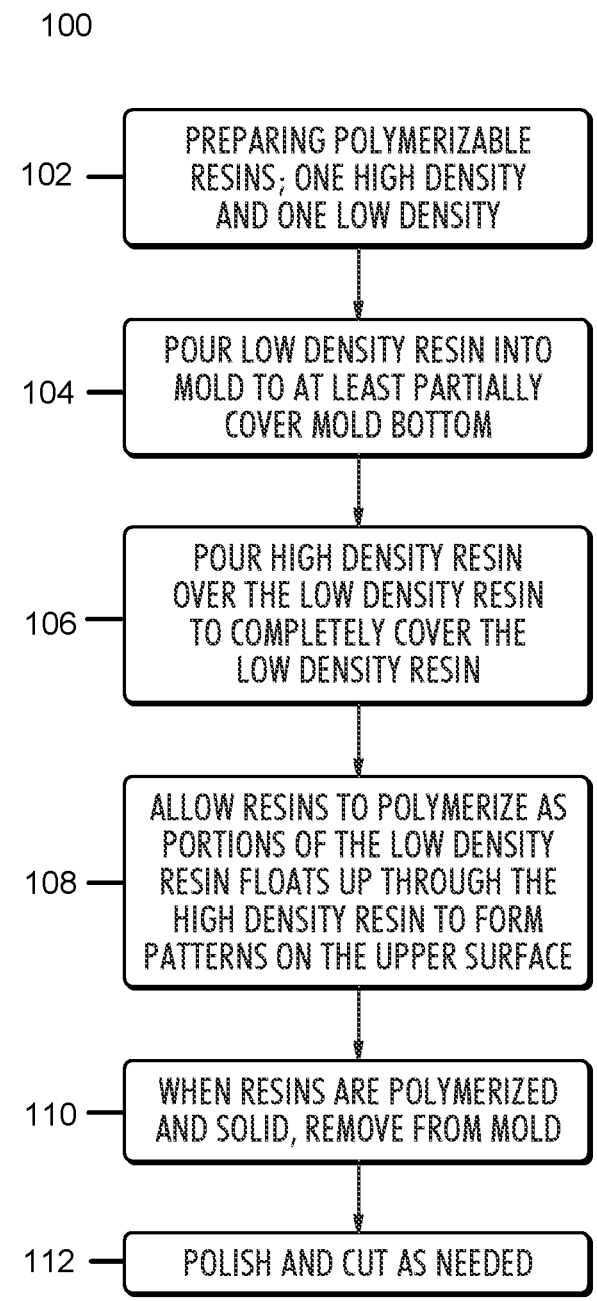
FIG. 1 is a flow chart of the process of this invention.

FIG. 1 of the drawings generally sets forth in a flow diagram a process 100 of this invention. At 102, At least two less than totally compatible resins are prepared in accordance with the manufacturer's specifications with appropriate catalyzers, stabilizers, densifiers, and pigments. The polymerizable resins comprise at least one low-density resin and one high-density resin. At 104, The low-density resin is placed first into a mold to at least partially cover the mold bottom. At 106, The high-density resin is then poured over the low-density resin to completely cover the low-density resin. At 108, The resins are allowed to polymerize as portions of the low-density resin float up through the high-density resin to form patterns on the upper surface thereof. At 110 and 112, The polymerization is then complete and the casting is solidified and removed from the mold for further processing as desired such as polishing and cutting to a desired configuration.

Figure 2:
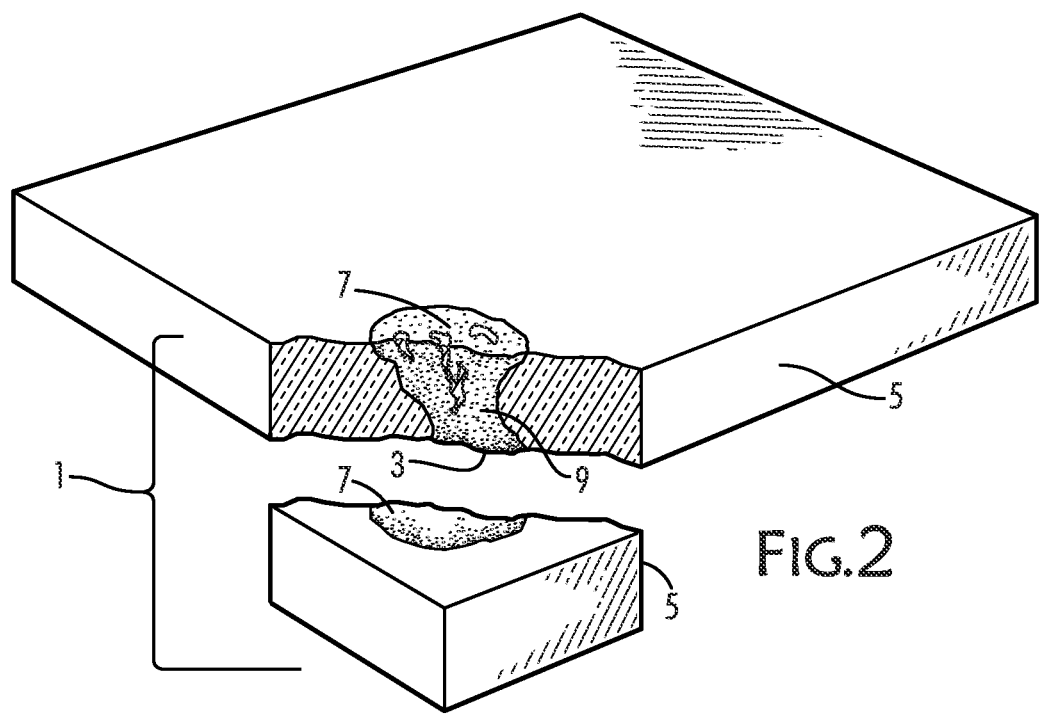
FIG. 2 is a perspective cross section of a product of this invention.

FIG. 2 of the drawings depicts a cast marble object 1 in a cross section showing a low-density resin 3 which is floated up through the high-density resin 5 to form a pattern 7 on the surface thereof. Portions of the low-density resin remain on the bottom thereof and form a partial pattern 9 in the cross section thereof. Portions of the low-density resin, 3 has risen to the surface 7.

The upper surface 8 within a mold is referred to as the drag side while the bottom surface 10 is referred to as the cope side.

At the conclusion of the casting process as described herein, the cast item may be utilized as cast with the drag side 8 up or it may be utilized with the cope side 10 up.

It is understood that viscosity plays a role in the appearance of the pattern 7 on both the drag and cope sides. A low-viscosity resin 5 tends to form a broader pattern 7 than a high viscosity resin.

Figure 3:
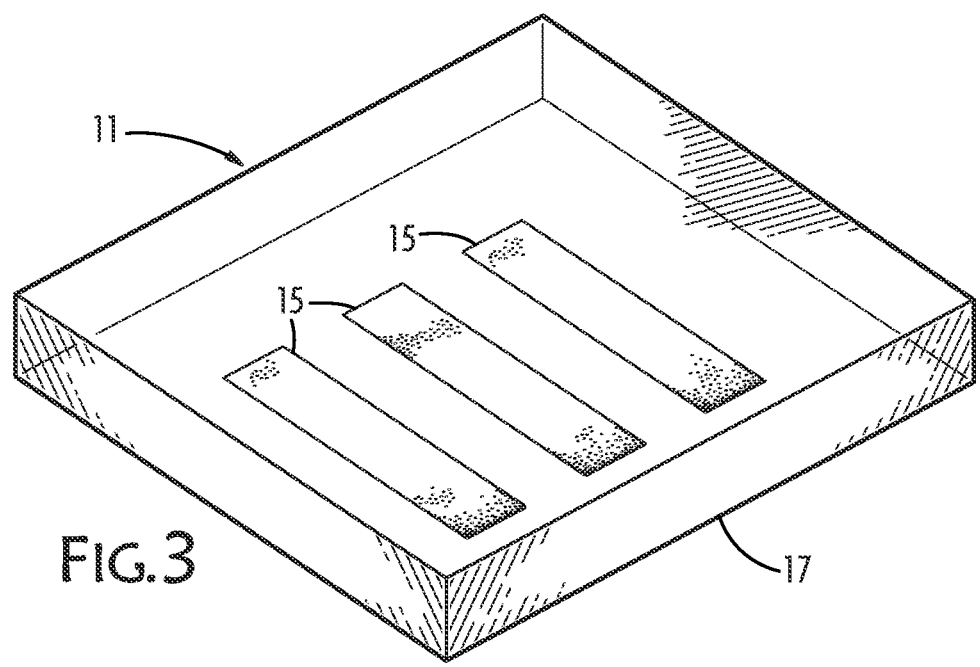
FIG. 3 is a casting mold used in this invention.

FIG. 3 depicts a mold 11 wherein low-density resin 15 is placed on the bottom 17 of the mold 11 in arbitrary patterns such as ribbons. The low-density deposited material 15 need not cover the entire surface of the bottom 17 of the mold 11, but, can do so in accordance with this invention to achieve unique patterns such as 7.

It has also been found that particle size and thixotropy play a role in the formation of the patterns occurring on the surface of the cast marble objects. Additionally $Al(OH)_3$ may be used as a filler and with very small particle sizes results in a thixotropic dispersion to create unique patterns. Larger particle size, e.g., 50 micron, results in a very different appearance on drag side 8 of the casting.

According to this invention, a cast marble object may also be produced according to the process set forth below.

A process for producing a simulated marble slab can include the steps: preparing a low viscosity polymerizable resin blend having aluminum hydroxide dispersed therein with a particle size of less than 20 microns; preparing a high viscosity polymerizable resin blend having aluminum hydroxide therein with a particle size of between 20 and 40 microns with a first pigment therein; preparing a high viscosity polymerizable resin blend having aluminum hydroxide therein at a particle size of 40 to 100 microns with a pigment therein, different from the first pigment; catalyzing all blends to polymerize said blends; mixing said blends together; and placing said mixed blends into a mold to produce said slab upon polymerization thereof.

Acrylic or polyester resins are appropriate for this invention, typical of those which have been previously utilized. One such resin is R306 polyester, available from HK Research of Hickory, N.C., which is a low viscosity resin. RO29 is a high viscosity polyester available from the same source. It has been found useful to utilize marble dust as a filler, such as from RJ Marshall #40 or $Al(OH)_3$ of various powder sites.

EXAMPLES

Having generally described this invention, the following specific examples are given:

Example 1

In a 5" by 12" flat mold, ¾ lbs. of polyester resin which is 1750 cp viscosity was blended with ¾ lbs. $Al(OH)_3$ which averaged 17 microns and having no pigment.

72 grams of polyester resin which is 3000 cp viscosity was blended with 3 grams of white liquid pigment and 82½ grams of 50 micron $Al(OH)_3$.

72 grams of polyester resin which is 3000 cp viscosity was blended with a 3 grams of green liquid pigment with 82½ grams of 100 micron $Al(OH)_3$.

After catalyzing, the blends were co-mingled in a bowl and poured into the mold while moving the bowl around in such a way as not to overly mix the blends.

Example 2

Blend number one comprised ⅝ pounds of polyester resin with viscosity of about 1750 cp. This was added to ¾ lb. of $Al(OH)_3$, which averaged 265 microns and no pigment.

Blend number two comprised 76½ grams of a polyester resin of about 3000 cp plus 3½ grams of white liquid pigment and 80 grams $Al(OH)_3$ which averaged 40 microns.

Blend number three comprised 76½ grams of a polyester resin of about 3000 cp plus 3½ grams of green liquid pigment plus 80 grams $Al(OH)_3$ which averaged 100 microns.

These two examples show the difference that particle size can make in the final product and that $Al(OH)_3$ causes increased incompatibility resulting in a more realistic marble appearance.

Example 3

A marble like vein is achieved by streaming a ribbon of high viscosity pigmented resin blended with $Al(OH)_3$ onto a mold and then pouring a less viscous and yet more dense resin blend on top of the ribbon. A higher density is achieved by using more mineral filler in the low viscosity blend. This causes the ribbon of high viscosity lower density resin blend to rise up through the higher density lower viscosity resin blend which is usually a lighter color than the ribbon. Some of the ribbon clings to the mold while the rest rises to the surface or drag side of the casting. This phenomena allows for a vein to be produced, which continues vertically all the way through the marble object. After polymerization, both the cope and drag sides of the casting are sanded because the ribbon has splayed out against the mold and also at the top of the slurry as shown in FIG. 2 to get the look needed for solid surface and desired thickness.

Example 4

A 5" by 12" flat mold was used. ¾ lbs. of polyester resin, which is 1000 cp viscosity, was blended with 1⅛ lbs. $Al(OH)_3$ which averaged 28 microns plus white pigment.

48 grams of polyester casting resin, which is 3000 cp viscosity, was blended with 2 grams of gray liquid pigment and 40 grams of $Al(OH)_3$, which averaged 8 microns.

After catalyzing both blends, the gray ribbons were placed in the mold in a vein like fashion, then the lower viscosity higher density white pigmented polymer was poured on top as in Example 3. This resulted in a realistic marble appearance on both surfaces.

Example 5

Three blends were prepared. ¾ lbs. of 700 cp viscosity polyester casting resin was blended with 1⅛ lbs. of 28 micron $Al(OH)_3$ and no pigment.

56 grams of 3000 cp of viscosity polyester casting resin was blended with 4 grams of white liquid pigment and 90 grams of 40 micron $Al(OH)_3$.

49 grams of 3000 cp polyester casting resin was blended with 1 gram of gray liquid pigment and 50 grams of 100 micron $Al(OH)_3$. This becomes the ribbon.

The first two blends were partially comingled. Ribbons were introduced in a 5" by 12" mold. The first two partially co-mingled blends were poured on top of the ribbons and solidified. This resulted in a realistic marble appearance with the ribbons appearing to be below a transparent surface. This appearance is referred to as solid surface.

Example 6

The first formula has three different blends. Blend 1 is 50 grams of polyesther casting resin that is 3000 cp viscosity plus 65 grams of $Al(OH)_3$, which averaged 17 microns with no pigment. Blend 2 is 50 grams of a high viscosity thixotropic gel coat resin plus 65 grams of $Al(OH)_3$ at 28 microns with no pigment. Blend 3 is ⅝ of a pound of polyesther marble casting resin that has a viscosity of about 1200 cp plus 2 pounds of marble dust, "RJ Marshall Company" plus white pigment.

All were catalyzed with a peroxide catalyst. Blend 1 was applied evenly to a 7"×8" mold. Blend 2 was applied on top of Blend 1. However, some areas are applied thicker than others in order to create inclusions with visual depth.

This phenomena happens because of the thixotropic aspect, which is partially incompatible with Blend 1 and Blend 3. Blend 3 is the "Marble Matrix" which is then dropped on top of Blend 2 in globs. All three blends found their positions based on density, viscosity and thixotropy. After polymerization, a travertine appearance resulted. Veins are produced because the "Globs" of matrix tends to force some of the Blends 1 and 2 to come together as each glob of matrix come together also. This action forces some of blends 1 and 2 up through the matrix in a fashion that creates the vein.

This illustrates that by densifying gel coat with $Al(OH)_3$ mineral which is translucent and by using more than just a "thin layer" on the mold and by leaving the densified gel coat wet and then adding the matrix results in a product with the visual depth and other natural looks.

The thixotropic aspect of this process causes some of the densified gel coat to remain next to the mold even though it is not as thick or as dense as the matrix which is applied on top of it. Also, some of the wet densified gel coat blend travels up through the matrix because of diffusion and the pressure of the weight of the matrix. This phenomenon is surprisingly consistent with regard to the appearance of the final product, which results in various crackle looks depending on formula, temperature and process.

This combines the best aspects of both cultured marble and solid surface. Solid surface, especially when using polyester resins, has a transparent/translucent/quality because the densifier is $Al(OH)_3$. The resin/marble dust blend which back up the solid surface like material is opaque, this gives color to the product and defines the visual depth created by the solid surface like gel coat.

The solid surface aspect can also be used to create a translucent "vein" in the final product. This simply requires blending a high viscosity gel coat resin with enough Al(OH)$_3$ so that the matrix when applied on top will only partially disburse the densified gel coat vein. The gel coat is applied with a brush or some other way to the mold in a vein like fashion and then the marble matrix is introduced on top. The effects of thixotropic and density cause most of the vein to remain next to the mold. This process generates a very convincing natural looking translucent vein which can be tinted or left clear.

A very consistent product can be generated as long as formula, temperature and process are repeated.

In conclusion, we can say that by using the "crackle" process and formula in tandem with the "vein" process and formula we can create very aesthetically natural stone look.

Example 7

A clear gel coat, such as that used for boat hulls, was placed in a 5"×12" mold in the traditional cultured marble way. The gel coat became tacky. Blend 1 was uniformly applied to the gel coat in the mold. Blend 1 consisted of 100 grams of a low viscosity gel coat plus 135 grams of Al(OH)$_3$, which is 100 microns. Blend 2 was applied with a brush in such a way as to mimic quartzite like inclusions. Blend 2 was 50 grams of a high viscosity gel coat plus 50 grams of Al(OH)$_3$ at 28 microns. Blend 3 was the "Marble Matrix" which was streamed on top of 1 and 2. This matrix blend was of a density and consistency which allowed Blends 1 and 2 to interact with the Marble Matrix by buoyancy and diffusion and downward pressure in such a way as to cause blends 1 and 2 to invade the Marble Matrix giving a marble like pattern with quartzite like inclusions to the final product. This matrix blend consisted of 1¼ lb. of 2000 cp polyesther marble casting resin plus 1½ lbs. of RJ Marshall #40 marble dust plus white pigment plus other colors partially mixed in the traditional cultured marble fashion. All three blends were catalyzed before introduction into the mold. This Example utilized thixotropic gel coats of different viscosity. They are densified by Al(OH)$_3$ as in formula #1. These interact with the marble matrix in such a way as to mimic something like travertine with the addition of quartzite inclusions. This demonstrates that wet densified Al(OH)$_3$ gives a translucent quality to the final product.

Having generally described the process of this invention and given specific examples thereof, the following claims define the metes and bounds thereof.

What is claimed is:

1. A process for producing a simulated marble slab, comprising of steps:
   preparing a first polymerizable resin blend having aluminum hydroxide dispersed therein with a particle size of less than 20 microns;
   preparing a second polymerizable resin blend having aluminum hydroxide therein with a particle size of between 20 and 40 microns with a first pigment therein;
   preparing a third polymerizable resin blend having aluminum hydroxide therein at a particle size of 40 to 100 microns with a pigment therein, different from the first pigment;
   catalyzing all blends to polymerize said blends;
   mixing said blends together; and
   placing said mixed blends into a mold to produce said slab upon polymerization thereof.

* * * * *